(12) United States Patent
Brown et al.

(10) Patent No.: US 9,879,597 B2
(45) Date of Patent: Jan. 30, 2018

(54) SPEED REDUCED DRIVEN TURBOCHARGER

(71) Applicant: VANDYNE SUPERTURBO, INC., Loveland, CO (US)

(72) Inventors: Jared William Brown, Loveland, CO (US); Tom Waldron, Loveland, CO (US); Ryan Sherrill, Loveland, CO (US)

(73) Assignee: VanDyne Superturbo, Inc., Loveland, CO (US)

( * ) Notice: Subject to any disclaimer, the term of this patent is extended or adjusted under 35 U.S.C. 154(b) by 283 days.

(21) Appl. No.: 14/885,781

(22) Filed: Oct. 16, 2015

(65) Prior Publication Data

US 2016/0123223 A1 May 5, 2016

Related U.S. Application Data

(60) Provisional application No. 62/068,029, filed on Oct. 24, 2014.

(51) Int. Cl.
*F02B 39/10* (2006.01)
*F01D 5/02* (2006.01)
(Continued)

(52) U.S. Cl.
CPC .......... *F02B 39/10* (2013.01); *B60W 10/00* (2013.01); *F02B 33/40* (2013.01); *F02B 37/10* (2013.01); *F02B 39/04* (2013.01); *F02B 39/12* (2013.01); *F02C 6/12* (2013.01); *F02C 7/36* (2013.01); *F04D 25/02* (2013.01); *F04D 25/024* (2013.01); *F04D 25/06* (2013.01); *F16H 13/00* (2013.01);
(Continued)

(58) Field of Classification Search
CPC .... F02C 6/12; F02C 7/36; F02B 37/10; F02B 39/10; F02B 33/40; F02B 39/04; F02B 39/12; F04D 25/02; F04D 25/024; F04D 25/06; B60W 10/00; F16H 13/00; F05D 2220/40; F05D 2260/402; F05D 2260/403; Y02T 10/144
See application file for complete search history.

(56) References Cited

U.S. PATENT DOCUMENTS

| 236,150 A | 1/1881 | Fitch |
| 1,526,493 A | 2/1925 | Dolton |

(Continued)

FOREIGN PATENT DOCUMENTS

| EP | 0517675 | 8/1995 |
| EP | 1400667 | 3/2004 |

(Continued)

OTHER PUBLICATIONS

U.S. Appl. No. 12/536,421, filed Aug. 5, 2009.

(Continued)

*Primary Examiner* — Igor Kershteyn
(74) *Attorney, Agent, or Firm* — William W. Cochran; Cochran Freund & Young LLC

(57) ABSTRACT

Disclosed is a speed reduced driven turbocharger that utilizes a step-down roller that is coupled to a turbo shaft with a traction interface. Either a flat or a shaped traction interface can be used. The step-down roller mechanically actuates either a mechanical or hydraulic transmission, or can be mechanically coupled to an electric motor/generator.

13 Claims, 11 Drawing Sheets

(51) Int. Cl.

| | | |
|---|---|---|
| *F02B 33/40* | (2006.01) | |
| *F02B 39/04* | (2006.01) | |
| *F02B 39/12* | (2006.01) | |
| *F04D 29/053* | (2006.01) | |
| *F04D 29/28* | (2006.01) | |
| *F04D 25/02* | (2006.01) | |
| *F04D 25/06* | (2006.01) | |
| *F02C 6/12* | (2006.01) | |
| *F02C 7/36* | (2006.01) | |
| *B60W 10/00* | (2006.01) | |
| *F02B 37/10* | (2006.01) | |
| *F16H 13/00* | (2006.01) | |

(52) U.S. Cl.
CPC .... *F05D 2220/40* (2013.01); *F05D 2260/402* (2013.01); *F05D 2260/403* (2013.01); *Y02T 10/144* (2013.01)

(56) References Cited

U.S. PATENT DOCUMENTS

| | | |
|---|---|---|
| 1,550,796 A | 8/1925 | Gammons |
| 1,686,446 A | 10/1928 | Gilman |
| 1,691,625 A | 11/1928 | Chilton |
| 1,718,846 A | 6/1929 | Arter |
| 1,979,170 A | 10/1934 | Nardone |
| 2,076,057 A | 4/1937 | Almen |
| 2,173,595 A | 9/1939 | Schutte |
| 2,216,494 A | 10/1940 | Kurtz et al. |
| 2,278,181 A | 3/1942 | Lieberherr |
| 2,397,941 A | 4/1946 | Birkigt |
| 2,412,351 A | 12/1946 | Mount |
| 2,542,539 A | 2/1951 | Kuhrt et al. |
| 2,573,258 A | 10/1951 | Gerritsen |
| 2,585,698 A | 2/1952 | Schneider |
| 2,585,968 A | 2/1952 | Schneider |
| 2,585,986 A | 2/1952 | Andreasson |
| 2,586,725 A | 2/1952 | Schottler |
| 2,590,800 A | 3/1952 | Stephenson |
| 2,620,621 A | 12/1952 | Nettel |
| 2,652,006 A | 9/1953 | Simonson |
| 2,696,888 A | 12/1954 | Chillson et al. |
| 2,701,970 A | 2/1955 | Kraus |
| 2,803,507 A | 8/1957 | Mempel et al. |
| 2,874,592 A | 2/1959 | Oehrli |
| 2,878,692 A | 3/1959 | Wolf |
| 2,901,924 A | 9/1959 | Banker |
| 2,905,026 A | 9/1959 | Oehrli |
| 2,913,932 A | 11/1959 | Oehrli |
| 2,941,422 A | 6/1960 | Barish |
| 2,973,671 A | 3/1961 | Elkins |
| 3,035,460 A | 5/1962 | Guichard |
| 3,044,683 A | 7/1962 | Woollenweber |
| 3,163,984 A | 1/1965 | Dumont |
| 3,203,278 A | 8/1965 | General |
| 3,237,468 A | 3/1966 | Schottler |
| 3,246,531 A | 4/1966 | Kashihara |
| 3,248,960 A | 5/1966 | Schottler |
| 3,293,945 A | 12/1966 | Stockton |
| 3,420,122 A | 1/1969 | Okabe |
| 3,423,927 A | 1/1969 | Scherenberg |
| 3,494,224 A | 2/1970 | Fellows et al. |
| 3,504,574 A | 4/1970 | Okabe |
| 3,673,797 A | 7/1972 | Wilkinson |
| 3,676,999 A | 7/1972 | Oldfield |
| 3,707,888 A | 1/1973 | Schottler |
| 3,745,844 A | 7/1973 | Schottler |
| 3,793,907 A | 2/1974 | Nakamura et al. |
| 3,988,894 A | 11/1976 | Melchior |
| 4,052,915 A | 10/1977 | Kraus |
| 4,089,569 A | 5/1978 | Rempel |
| 4,215,549 A | 8/1980 | Daeschner |
| 4,270,400 A | 6/1981 | Fodor |
| 4,287,791 A | 9/1981 | Numazawa et al. |
| 4,312,183 A | 1/1982 | Regar |
| 4,314,485 A | 2/1982 | Adams |
| 4,345,486 A | 8/1982 | Olesen |
| 4,378,677 A | 4/1983 | Lumstein |
| 4,398,436 A | 8/1983 | Fisher |
| 4,424,726 A | 1/1984 | Gailbraith |
| 4,449,370 A | 5/1984 | Ream |
| 4,489,992 A | 12/1984 | Brandenstein et al. |
| 4,541,305 A | 9/1985 | Hamabe |
| 4,570,501 A | 2/1986 | de Bris Perry |
| 4,592,247 A | 6/1986 | Mutschler |
| 4,593,574 A | 6/1986 | Sinn et al. |
| 4,616,481 A | 10/1986 | Melchior et al. |
| 4,667,525 A | 5/1987 | Schottler |
| 4,693,134 A | 9/1987 | Kraus |
| 4,700,542 A | 10/1987 | Wang |
| 4,718,781 A | 1/1988 | Gerard |
| 4,729,225 A | 3/1988 | Bucher |
| 4,856,374 A | 8/1989 | Kreuzer |
| 5,025,671 A | 6/1991 | Kraus |
| 5,033,269 A | 7/1991 | Smith |
| 5,037,361 A | 8/1991 | Takahashi |
| 5,385,514 A | 1/1995 | Dawe |
| 5,397,279 A | 3/1995 | McCotter, Jr. |
| 5,458,855 A | 10/1995 | Gillbrand |
| 5,551,929 A | 9/1996 | Fritsch |
| 5,560,207 A | 10/1996 | Ramsden et al. |
| 5,586,540 A | 12/1996 | Marzec et al. |
| 5,713,204 A | 2/1998 | Kadlicko |
| 5,724,813 A | 3/1998 | Fenelon et al. |
| 5,729,978 A | 3/1998 | Hiereth et al. |
| 5,775,417 A | 7/1998 | Council |
| 5,887,434 A | 3/1999 | Amell et al. |
| 5,974,792 A | 11/1999 | Iosbe |
| 6,041,602 A | 3/2000 | Dickey |
| 6,050,094 A | 4/2000 | Udd et al. |
| 6,050,095 A | 4/2000 | Blake |
| 6,095,940 A | 8/2000 | Ai et al. |
| 6,145,313 A | 11/2000 | Arnold |
| 6,227,180 B1 | 5/2001 | Hoffmann et al. |
| 6,343,473 B1 | 2/2002 | Kanesaka |
| 6,406,399 B1 | 6/2002 | Ai |
| 6,408,626 B1 | 6/2002 | Amell |
| 6,470,864 B2 | 10/2002 | Kim et al. |
| 6,601,388 B1 | 8/2003 | Gladden |
| 6,651,432 B1 | 11/2003 | Gray, Jr. |
| 6,681,574 B2 | 1/2004 | Berglund et al. |
| 6,725,653 B2 | 4/2004 | Brown et al. |
| 6,729,315 B2 | 5/2004 | Onodera et al. |
| 282,699 A1 | 7/2004 | Barthelet et al. |
| 6,857,263 B2 | 2/2005 | Gray, Jr. et al. |
| 6,871,498 B1 | 3/2005 | Allen et al. |
| 6,912,852 B2 | 7/2005 | Gottemoller et al. |
| 6,960,147 B2 | 11/2005 | Kolstrup |
| 6,994,531 B2 | 2/2006 | Dairokuno et al. |
| 7,025,042 B2 | 4/2006 | Gray, Jr. |
| 7,032,382 B2 | 4/2006 | Onodera et al. |
| 7,055,507 B2 | 6/2006 | Kelley, Jr. |
| 130,946 A1 | 6/2007 | Winsor et al. |
| 7,237,532 B2 | 7/2007 | Gray, Jr. |
| 7,455,617 B2 | 11/2008 | Miller et al. |
| 7,490,594 B2 | 2/2009 | VanDyne et al. |
| 7,491,149 B2 | 2/2009 | Greenwood et al. |
| 7,492,594 B2 | 2/2009 | Pal |
| 7,540,818 B2 | 6/2009 | Miller et al. |
| 8,062,161 B2 | 11/2011 | Marumoto |
| 8,561,403 B2 | 10/2013 | VanDyne et al. |
| 8,608,609 B2 | 12/2013 | Sherrill et al. |
| 8,668,614 B2 | 3/2014 | Sherrill et al. |
| 8,677,751 B2 | 3/2014 | VanDyne et al. |
| 8,769,949 B2 | 3/2014 | VanDyne et al. |
| 8,820,056 B2 | 9/2014 | VanDyne et al. |
| 9,217,363 B2 | 12/2015 | Riley et al. |
| 2003/0196436 A1 | 10/2003 | Hoecker et al. |
| 2005/0277514 A1 | 12/2005 | Hiroyuki et al. |
| 2006/0032225 A1 | 2/2006 | VanDyne |
| 2006/0070382 A1 | 4/2006 | Karlsson |
| 2006/0157291 A1 | 7/2006 | Puiu et al. |
| 2007/0062189 A1 | 3/2007 | Keppeler et al. |

(56) References Cited

U.S. PATENT DOCUMENTS

| | | |
|---|---|---|
| 2007/0130094 A1 | 6/2007 | Lien et al. |
| 2007/0130946 A1 | 6/2007 | Winsor et al. |
| 2007/0130948 A1 | 6/2007 | Boehm et al. |
| 2007/0197337 A1 | 8/2007 | Miller et al. |
| 2007/0275809 A1 | 11/2007 | Miller et al. |
| 2008/0141810 A1 | 6/2008 | Miller et al. |
| 2008/0236150 A1 | 10/2008 | Jarvi |
| 2008/0276756 A1 | 11/2008 | Marumoto |
| 2008/0282699 A1 | 11/2008 | Barthelet et al. |
| 2009/0277431 A1 | 11/2009 | Nitzke et al. |
| 2010/0031935 A1 | 2/2010 | VanDyne et al. |
| 2010/0174456 A1 | 7/2010 | Beaudoin et al. |
| 2010/0236503 A1 | 9/2010 | Beret et al. |
| 2012/0060499 A1* | 3/2012 | Nitzke .............. F02D 9/04 60/605.2 |
| 2012/0165151 A1 | 6/2012 | Sherrill |
| 2015/0141188 A1 | 5/2015 | Sherrill |
| 2016/0146096 A1 | 5/2016 | Sherrill et al. |

FOREIGN PATENT DOCUMENTS

| | | |
|---|---|---|
| EP | 01300946 | 12/2004 |
| EP | 0994245 | 6/2005 |
| EP | 1550796 | 7/2005 |
| EP | 1711699 | 3/2007 |
| GB | 0206845 | 2/1924 |
| GB | 557970 | 12/1943 |
| JP | 61164039 | 7/1986 |
| JP | 3153947 | 7/1991 |
| WO | 2006022635 | 3/2006 |
| WO | 2008008379 | 1/2008 |
| WO | 2011011019 | 1/2011 |
| WO | 2012170001 | 12/2012 |

OTHER PUBLICATIONS

U.S. Appl. No. 61/086,401, filed Aug. 5, 2008.
U.S. Appl. No. 61/231,628, filed Aug. 5, 2009.
International Search Report, dated May 4, 2012, in PCT Application Serial No. PCT/US2012/021932.
International Search Report, dated May 4, 2012, in PCT Application Serial No. PCT/US11/67151.
International Search Report, dated May 4, 2012, in PCT Application Serial No. PCT/US10/23398.
International Search Report, dated May 4, 2012, in PCT Application Serial No. PCT/US09/51742.
International Search Report, dated May 4, 2012, in PCT Application Serial No. PCT/US11/22298.

* cited by examiner

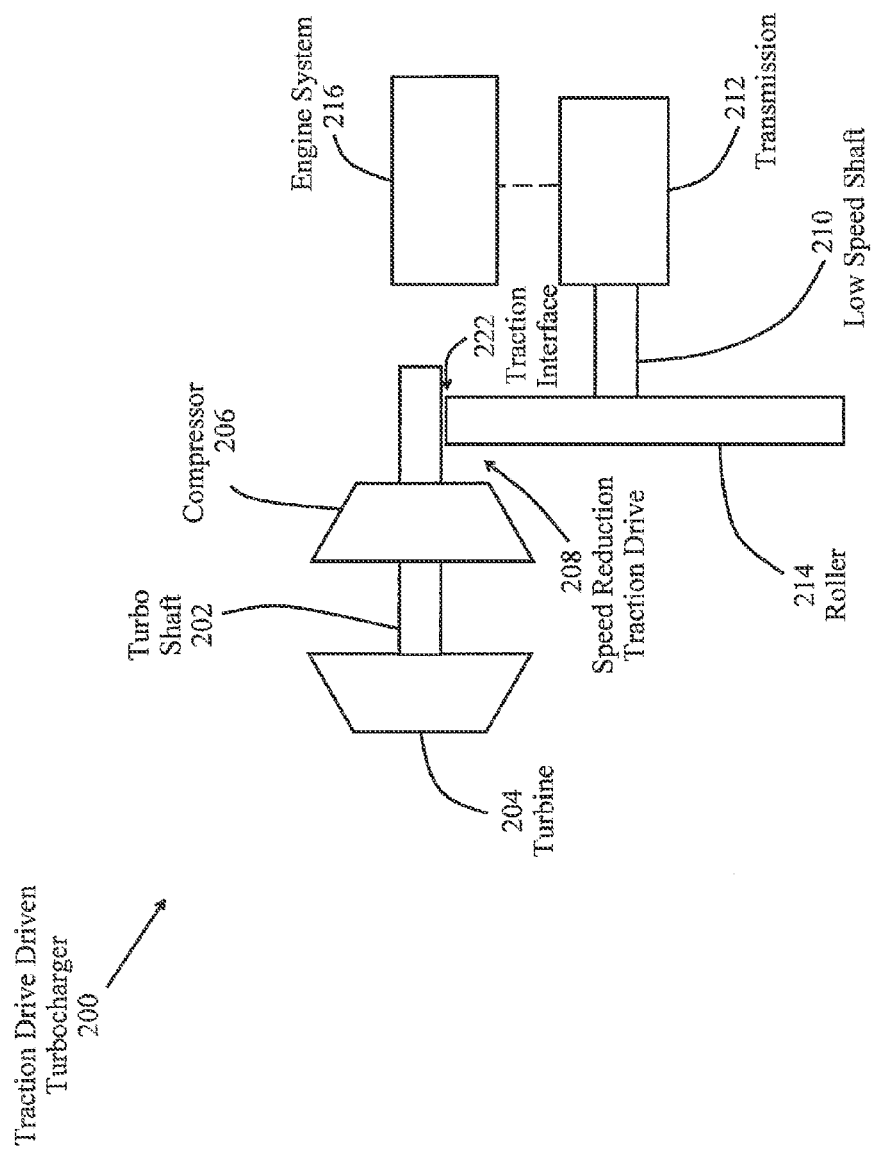

SPEED REDUCED DRIVEN TURBOCHARGER

BACKGROUND

Driven turbochargers are an improvement over normal turbochargers since driven turbochargers (super-turbochargers) are powered by more than just the exhaust gas turbine, which reduces turbo-lag in boosted engines. One class of driven turbocharger that has seen much development work is the electric turbocharger, where an electric motor/generator is integrated on the turbo shaft, and can drive the turbo shaft quickly up to speed and extract extra energy from the turbo shaft.

SUMMARY

An embodiment of the present invention may therefore comprise a driven turbocharger for an engine system comprising: a turbo shaft; a compressor connected to a first location on the turbo shaft; a turbine connected to a second location on the turbo shaft; a roller coupled to the turbo shaft through a traction interface at a third location on the shaft, the roller having a diameter that is larger than a diameter of the turbo shaft at the third location so that rotational speed of the roller is less than rotational speed of the turbo shaft; a low speed shaft that is connected to the roller; a transmission that is coupled to the low speed shaft and the engine system to transfer power between the driven turbocharger and the engine system so that the low speed shaft drives and is driven by the transmission at a rotational speed that is less than a rotational speed of the turbo shaft.

An embodiment of the present invention may further comprise a method of coupling a driven turbocharger to an engine system comprising: creating a traction interface between a turbo shaft that is connected to a turbine and a compressor and a roller that has a roller diameter that is larger than a diameter of the turbo shaft; connecting a low speed shaft, that is connected to the roller, to a transmission that transfers power between the engine system and the turbo shaft.

An embodiment of the present invention may further comprise a driven turbocharger for an engine system comprising: a turbo shaft having a first diameter; a compressor connected to a first location of the turbo shaft; a turbine connected to a second location of the turbo shaft; a first roller having a second diameter that is greater than the first diameter of the turbo shaft that interfaces with the turbo shaft at a third location on a first side of the turbo shaft; a second roller, having a third diameter, that interfaces with the turbo shaft at the third location on a second side of the turbo shaft, the second side being substantially opposite to the first side of the turbo shaft; a first electric motor/generator that is coupled to the first roller and is electrically coupled to the engine system, so that power can be transferred between the engine system and the turbo shaft; a second electric motor/generator that is coupled to the second roller and is electrically coupled to the engine system, so that power can be transferred between the engine system and the turbo shaft.

BRIEF DESCRIPTION OF THE DRAWINGS

FIGS. 2A and 2B are schematic drawings of roller traction drives that are driven by an outer part of the turbo shaft.

DETAILED DESCRIPTION OF THE EMBODIMENTS

Figure 1A:
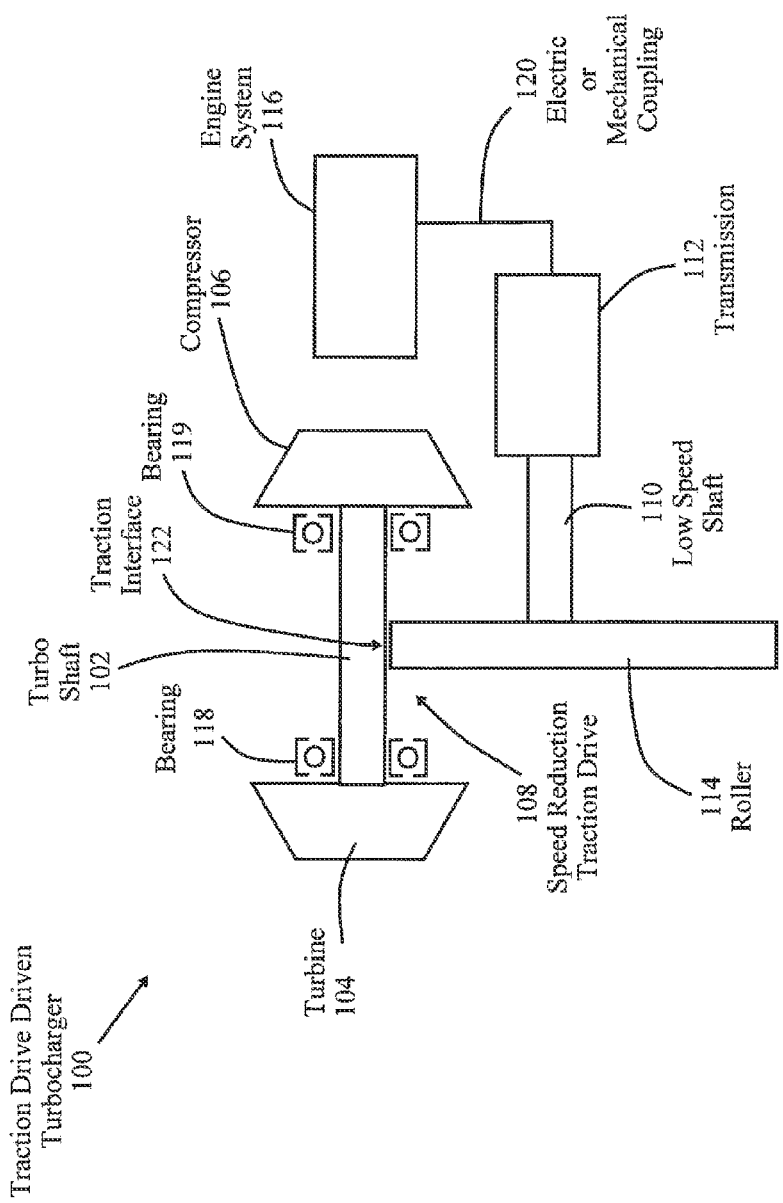
FIGS. 1A and 1B are schematic drawings of roller traction drives that are driven by a middle section of the turbo shaft.

FIG. 1A is a schematic drawing of an embodiment of a speed reduction traction drive driven turbocharger 100 that provides boost to an engine system 116. Turbo shaft 102 has a compressor 106 attached to one end, and a turbine 104 attached to the other end. Speed reduction traction drive 108 mates with a central part of turbo shaft 102, and consists of roller 114 in contact with turbo shaft 102. Roller 114 has a diameter greater than turbo shaft 102, so that the rotational speed of roller 114 is less than the rotational speed of turbo shaft 102. Roller 114 is pressed against turbo shaft 102 to generate a normal force against turbo shaft 102 to transmit torque between roller 114 and turbo shaft 102 at traction interface 122. The force can be applied through low speed shaft bearings (not shown), or other bearings, and can be applied by various devices, such as disclosed in U.S. Pat. No. 8,561,403, issued Oct. 22, 2013, entitled "Super-Turbocharger Having a High Speed Traction Drive and a Continuously Variable Transmission" which is specifically incorporated herein by reference for all that it discloses and teaches. The interface 122, between the turbo shaft 102 and the roller 114, is a traction interface. Traction fluids can be used in the traction interface 122 to increase friction and longevity of the traction interface 122. In this way, torque can be transmitted to turbo shaft 102 during transient operation of engine system 116 to quickly increase the rotational speed of turbo shaft 102 and reduce turbo lag, and torque can be transmitted from turbo shaft 102 to roller 114 during high load operation of engine system 116 when turbine 104 generates more power than compressor 106 consumes. Bearings 118, 119 locate turbo shaft 102, in the position shown in FIG. 1A, and absorb forces on turbo shaft 102, such as normal force from roller 114 or thrust forces from turbine 104 and compressor 106. Low speed shaft 110 connects roller 114 to transmission 112. Transmission 112, in turn, connects the speed reduction traction drive driven turbocharger 100 to engine system 116 via electrical or mechanical coupling 120. The lower rotational speed of low speed shaft 110 allows traditional electric motors, generators, or mechanical transmissions to be used for transmission 112. Transmission 112 can be a mechanical continuously variable transmission (CVT) or hydraulic CVT that is mechanically coupled to engine system 116 to control the speed of turbo shaft 102 depending on operating conditions of engine system 116. Transmission 112 can also be a discrete, geared mechanical transmission with one or more gear ratios that is mechanically coupled to engine system 116. A third option is that transmission 112 can be an electric motor/generator that is electrically coupled to power electronics of engine system 116 as shown in FIGS. 2D, 2E.

Figure 1B:
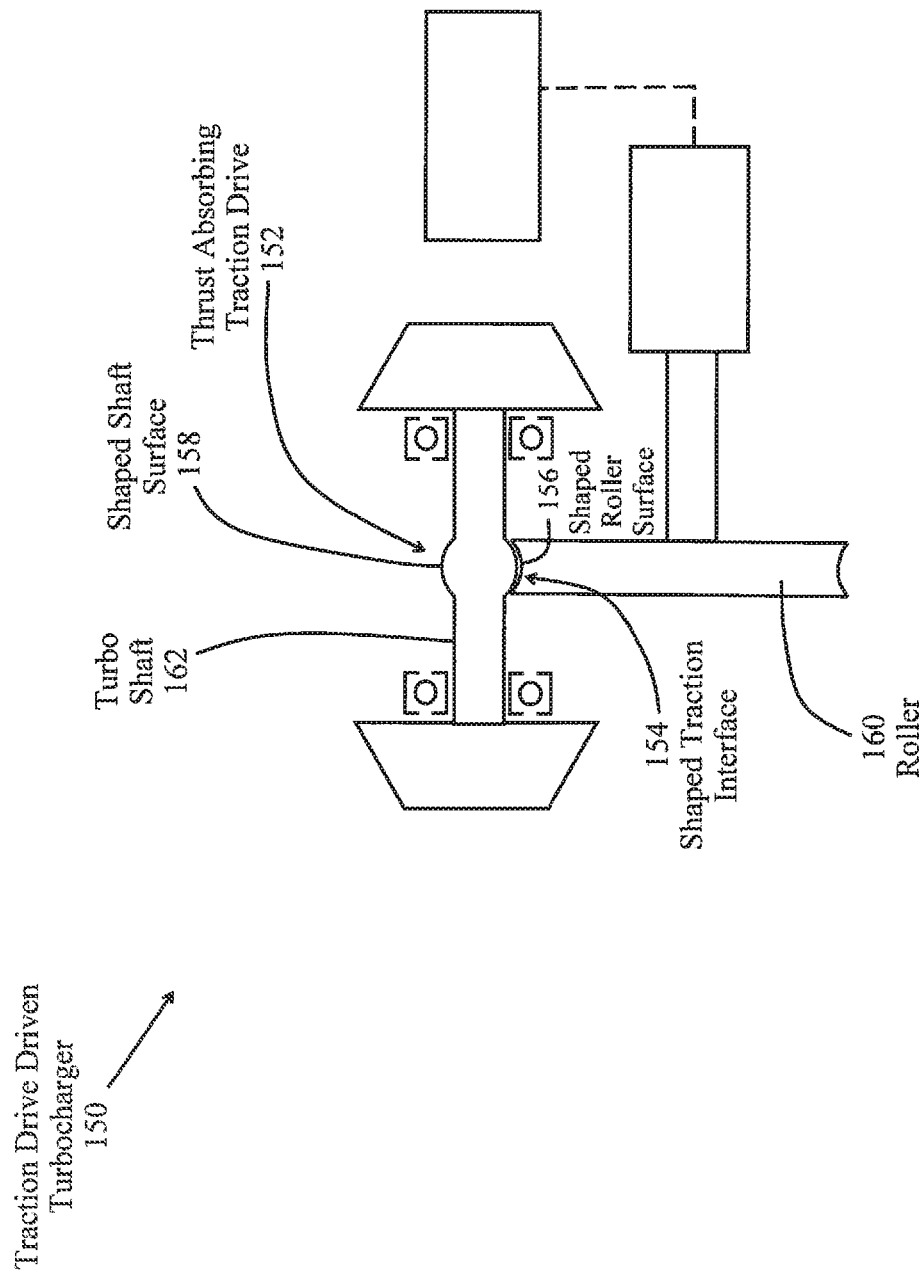
Figure 2B:
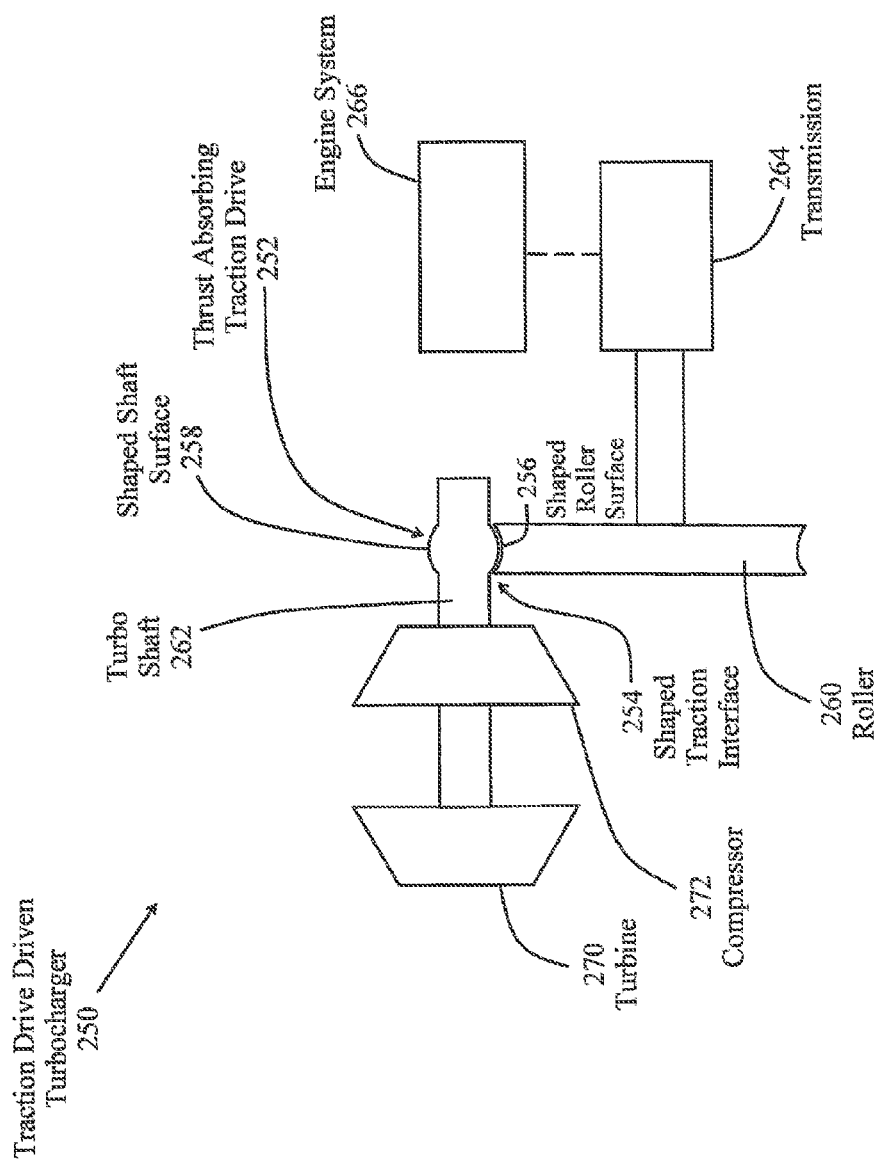
Figure 2C:
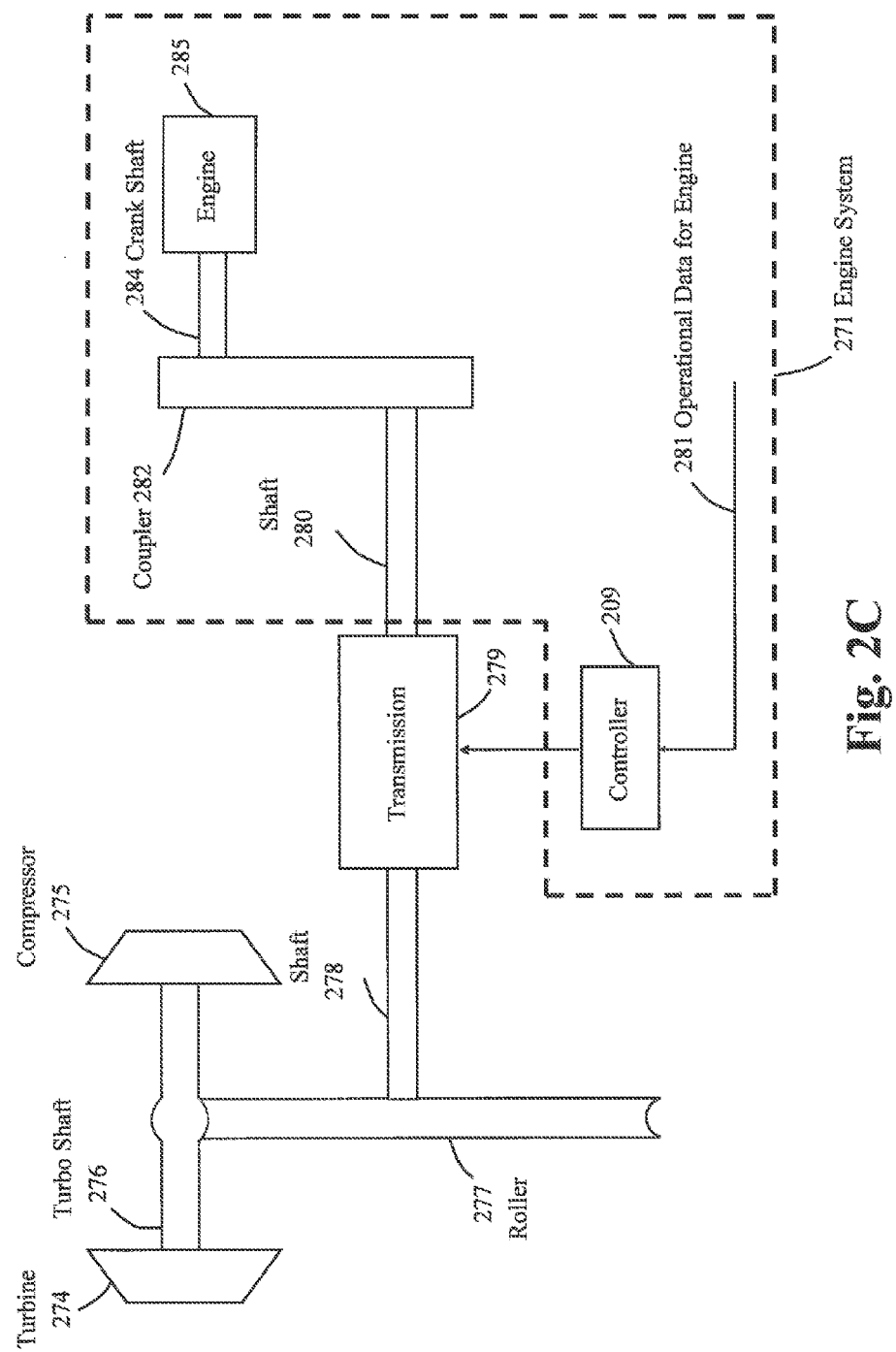
FIG. 2C is a schematic diagram of another embodiment of the invention.
Figure 2D:
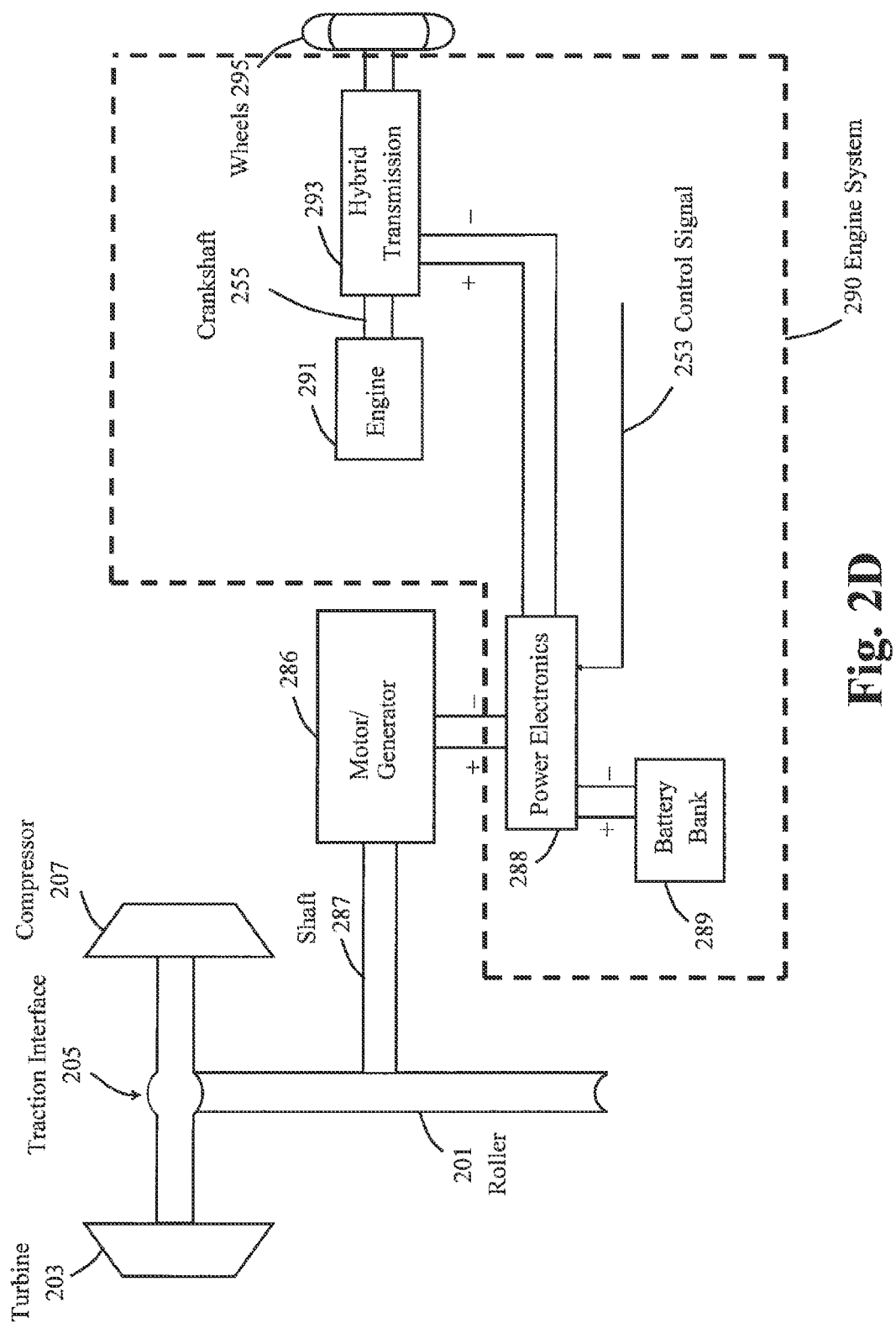
FIG. 2D is a schematic diagram of another embodiment of the invention illustrating an electric motor-generator transmission applied to a hybrid electric vehicle.
Figure 2E:
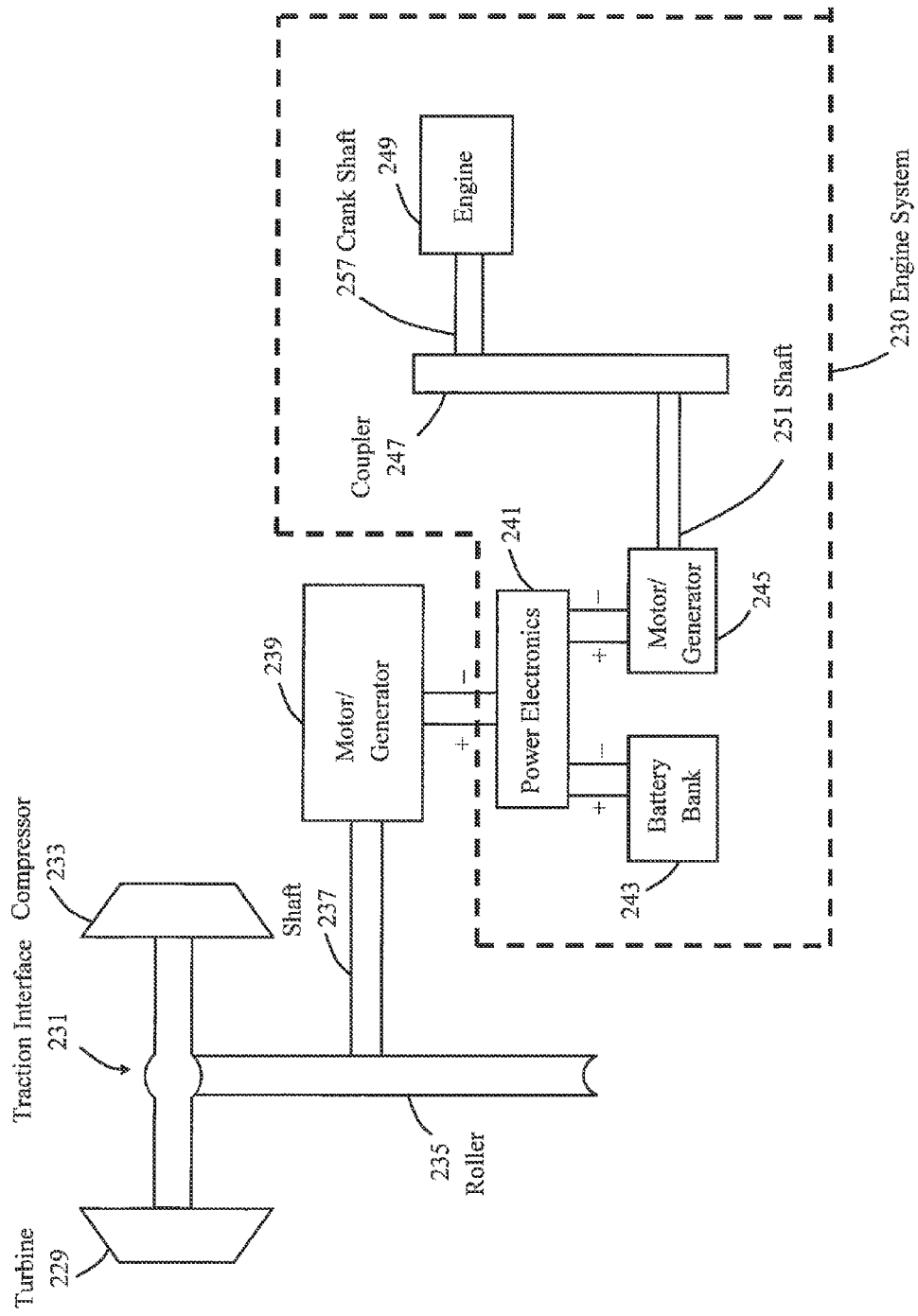
FIG. 2E illustrates another embodiment for implementing the transmission/electric motor/generator as a transmission.

Various configurations of engine system 116 are shown in FIGS. 2C, 2D, and 2E, and these engine system configurations can be used in the embodiments shown in FIGS. 1B, 2A, 2B, 3A, 3B, 4A, and 4B as well. Bearings 118 and 119 hold the turbo shaft 102 in place and may also comprise thrust bearings that are capable of absorbing large axial forces.

FIG. 1B is a schematic representation of a traction drive driven turbocharger 150. The driven turbocharger 150 is the same as the driven turbocharger 100 of FIG. 1A with the exception that the driven turbocharger 150 uses a thrust absorbing traction drive 152. The thrust absorbing traction drive 152 has a shaped traction interface 154 that functions to center the shaped shaft surface 158 and the shaped roller surface 156 in response to any lateral forces on either the roller 160 or the turbo shaft 162, i.e., forces in the horizontal direction, as illustrated in FIG. 1B. The shaped shaft surface 158 and the shaped roller surface 156 are shown as curved shapes. However, various shapes can be used, such as disclosed in U.S. Patent Application Ser. No. 61/906,938, filed Nov. 21, 2013, entitled "Thrust Absorbing Planetary Traction Drive Superturbo," which is specifically incorporated herein for all that it discloses and teaches.

FIG. 2A is a schematic drawing of an alternative embodiment of the traction drive driven turbocharger 200. The operation of this embodiment is effectively the same as FIG. 1A, except that speed reduction traction drive 208 mates to turbo shaft 202 at a point on turbo shaft 202 that is external to compressor 206. In this manner, the parts of the speed reduction traction drive driven turbocharger 200 are moved away from the heat of turbine 204. The function of the driven turbocharger 200 is the same. The traction drive 208 consists of a roller 214 in contact with turbo shaft 202 to form a traction interface 222 that transmits torque between roller 214 and turbo shaft 202, and results in a reduction of the rotational speed of low speed shaft 210 from turbo shaft 202. Low speed shaft 210 connects roller 214 to transmission 212, which in turn transmits power to and from engine system 216.

The transmission, illustrated in FIGS. 1A, 1B, 2A and 2B can either be a mechanical transmission, such as disclosed above, or can comprise a combined motor/generator that generates electricity when the roller 214 and low speed shaft 210 are being driven by the turbo shaft 202, or functions as a motor to drive the low speed shaft 210 and roller, and thereby drive the compressor 206 to provide supercharging depending upon operating conditions of the engine system. This embodiment is disclosed in more detail in U.S. Pat. No. 8,561,403, issued Oct. 22, 2013, entitled "Super-Turbocharger Having a High Speed Traction Drive and a Continuously Variable Transmission," which is specifically incorporated herein for all that it discloses and teaches.

FIG. 2B shows a traction drive driven turbocharger 250 that is the same as the embodiment of FIG. 2A, except that a thrust absorbing traction drive 252 is utilized, rather than a flat traction interface 222 (FIG. 2A). In other words, the turbine 270, compressor 272, the transmission 264 and the engine system 266 are the same as the corresponding devices in FIG. 2A. As illustrated in FIG. 2B, the thrust absorbing traction drive 252 includes a shaped traction interface 254. Again, various shapes can be used, as taught in U.S. Patent Application Ser. No. 61/906,938, filed Nov. 21, 2013, entitled "Thrust Absorbing Planetary Traction Drive Superturbo," which has been specifically incorporated herein by reference for all that it discloses and teaches. The turbo shaft 262 has a shaped shaft surface 258 which substantially matches the shaped roller surface 256 of the roller 260.

FIGS. 2C, 2D and 2E show various embodiments that employ the combinations of the transmission 112 of FIG. 1A, the engine system 116 of FIG. 1A, and similar components shown in the other figures. FIGS. 2C, 2D and 2E all disclose different ways of combining the various elements of electric motor/generators, transmissions, and battery systems that can be used as implementing systems in the other figures disclosed herein.

FIG. 2C is a schematic diagram of another embodiment of an application of the invention. As illustrated in FIG. 2C, the turbine 274 is connected to the compressor 275 with a turbo shaft 276. Roller 277 has a shaped traction surface that interfaces with the turbo shaft 276. Shaft 278 is connected to the roller 277 and drives, or is driven by, transmission 279. Transmission 279 is an interface between shaft 278 and shaft 280. The transmission 279 can be a continuously variable transmission (CVT), a mechanical discreet transmission, a hydraulic transmission, or other transmission. The transmission 279 allows shaft 278 and shaft 280 to rotate at different rotational speeds. Transmission 279 is connected to engine system 271, which is composed of shaft 280, coupler 282, crankshaft 284, engine 285, and controller 209. Engine system 271 corresponds to the engine systems in various embodiments in FIGS. 1A, 1B, 2A, 2B, 3A, 3B, 4A and 4B. Transmission 279 operates in response to a controller 209 that monitors operational data 281 relating to the operational conditions of the engine, as disclosed more fully in U.S. Pat. No. 8,561,403, issued Oct. 22, 2013, entitled "Super-turbocharger Having a High Speed Traction Drive and Continuously Variable Transmission," and U.S. Pat. No. 8,769,949, issued Jul. 8, 2014, entitled "Superturbocharger Control Systems" which are specifically incorporated herein for all that they disclose and teach. Shaft 280 either drives, or is driven by, coupler 282. Coupler 282 may comprise any type of mechanical coupler, such as a chain, belt, gears, traction drive, etc. Coupler 282 is coupled to the crankshaft 284 of the engine 285. During certain operational conditions, such as when engine 285 is being operated at high power, and there is excess power from the turbine 274, the transmission 279 can be adjusted so that crankshaft 284 of engine 285 is assisted in being driven by the excess power from the turbine 274. In other operational conditions, such as during start-up, when there is a call for acceleration, the engine 285 can drive the crankshaft 284 to drive the turbo shaft 276 and compressor 275, so that the system illustrated in FIG. 2C operates as a supercharger. Again, this is done by adjusting the transmission 279 using the controller 209. Operation of the controller is disclosed in U.S. Pat. No. 8,769,949, issued Jul. 8, 2014, entitled "Superturbocharger Control Systems," which is specifically incorporated herein by reference for all that it discloses and teaches.

FIG. 2D illustrates another embodiment in which the shaft 287 drives, or is driven by, motor/generator 286 in a hybrid vehicle. Motor/generator 286 is electrically connected to power electronics 288. Motor/generator 286 is an embodiment of a transmission as described in FIGS. 1A, 1B, 2A, 2B, 3A, 3B, 4A and 4B and is connected to engine system 290, which is composed of engine 291, crankshaft 255, hybrid transmission 293, power electronics 288, and battery bank 289. Engine system 290 corresponds to the engine systems in various embodiments in FIGS. 1A, 1B, 2A, 2B, 3A, 3B, 4A and 4B. When the motor/generator 286 is operating as a generator, the turbine 203, roller 201 and shaft 287 drive the generator portion of the motor/generator 286 to generate electrical power which is applied to the power electronics 288. That electrical power from motor/generator 286 is then applied to the battery bank 289 to charge the battery bank 289, or to hybrid transmission 293 to power the wheels 295 as specified by control signal 253. When the engine 291 is operating at high output power, excess energy from turbine 203 can be transferred from the turbine 203 through the traction interface 205, to roller 201 and shaft 287. Control signal 253 controls the power electronics 288 to apply the electrical power from motor/generator 286 to charge battery bank 289 or provide power to hybrid transmission 293.

The system illustrated in FIG. 2D can also function as a supercharger. The motor portion of the motor/generator 286 can be operated by battery bank 289 through power electronics 288 in response to control signal 253 to drive shaft 287, roller 201 and compressor 207 to produce supercharging. This may occur when there is a request for high power and a low amount of exhaust gases are being produced to drive turbine 203, which happens during initial acceleration conditions.

FIG. 2E is another embodiment illustrating an embodiment where motor/generator 239 acts as a transmission from FIGS. 1A, 1B, 2A, 2B, 3A, 3B, 4A and 4B and is connected to engine system 230, which is composed of engine 249, crank shaft 257, coupler 247, shaft 251, motor/generator 245, power electronics 241, and battery bank 243. Engine system 230 corresponds to the engine systems in various embodiments in FIGS. 1A, 1B, 2A, 2B, 3A, 3B, 4A and 4B.—As illustrated in FIG. 2E, turbine 229 operates in response to exhaust gases from engine 249. Turbine 229 rotates compressor 233 and roller 235 through the traction interface 231. Roller 235 rotates the shaft 237. The rotational mechanical energy on shaft 237 operates the generator portion of the motor/generator 239. The generator portion of the motor/generator 239 generates electric energy, which is applied to the power electronics 241. All or a portion of the electrical energy is stored in battery bank 243. The electrical energy from the generator portion of motor/generator 239 may also operate the motor portion of motor/generator 245 by application of electrical energy from power electronics 241. Battery bank 243 may also provide electrical energy to supplement or replace all of the electrical energy from the generator portion of motor/generator 239 to operate the motor portion of the motor/generator 245. The motor portion of motor/generator 245 rotates shaft 251. Coupler 247 transfers the rotational mechanical energy from shaft 251 to crankshaft 257 of engine 249 to assist rotation of crankshaft 257.

The system of FIG. 2E may also be operated in a supercharging mode. In this instance, engine 249 generates rotational mechanical energy on crankshaft 257 that is transferred to coupler 247. Coupler 247 may comprise any type of coupler or transmission for transferring rotational mechanical energy between shaft 251 and crankshaft 257. Shaft 251 operates the generator portion of motor/generator 245 that generates electrical energy that is applied to power electronics 241. Electrical energy from battery bank 243 can also be applied to the power electronics 241, which can be used to supplement the electrical energy generated by the generator portion of motor/generator 245 produced by rotational mechanical energy produced by engine 249. Power electronics 241 uses the electrical energy produced by motor/generator 245 and/or battery bank 243 to operate the motor portion of the motor/generator 239. The motor portion of the motor/generator 239 rotates shaft 237 and roller 235. Compressor 233 is rotated from the rotational mechanical energy of roller 235 that is transmitted through the traction interface 231. In this manner, the system of FIG. 2E functions as a combined turbocharger and supercharger, which is commonly referred to as a driven turbocharger.

As also illustrated in FIG. 2E, mechanical resistance can be created by the generator portion of motor/generator 245 by activating the fields of the generator portion to achieve resistance in shaft 251 to slow the engine 249 to achieve braking. In this case, the generator generates electrical energy that is applied to power electronics 241, which is used to charge the battery bank 243. In this way, regenerative braking of the vehicle can be achieved by the system.

Accordingly, FIGS. 2C, 2D, and 2E illustrate the various embodiments that can be employed in FIGS. 1A, 1B, 2A, 2B, 3A, 3B, 4A and 4B.

Figure 3A:
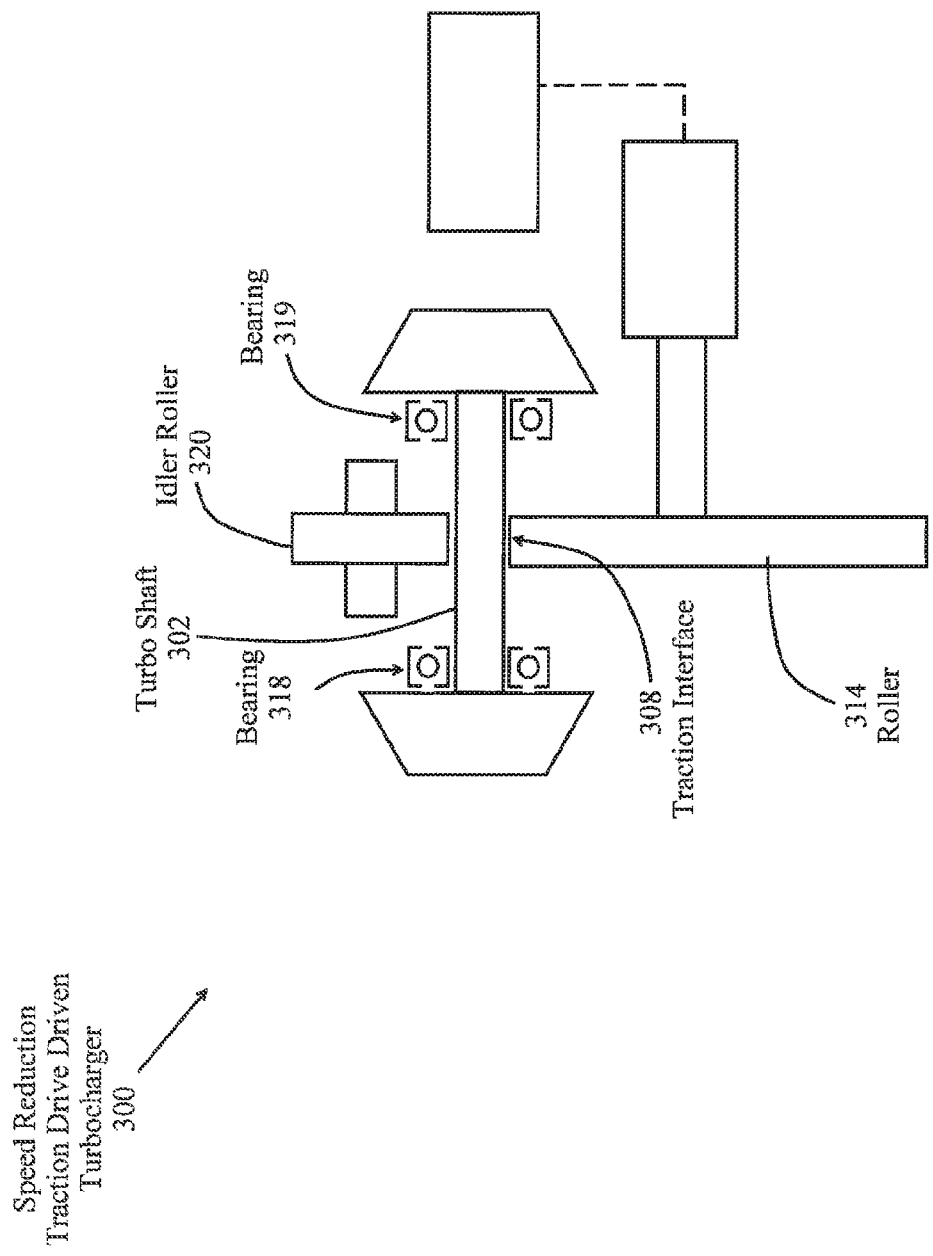
FIGS. 3A and 3B are schematic drawings of roller traction drives with an idler roller on the opposite side of the turbo shafts from the single rollers to counter normal forces from the traction drive.

FIG. 3A is a schematic drawing of another embodiment of a speed reduction traction drive driven turbocharger 300. As shown in FIG. 3A, an idler roller 320 interfaces with turbo shaft 302 at a location that is substantially opposite to roller 314. For traction interface 308 to transmit torque, a substantially normal force must exist between roller 314 and turbo shaft 302. The addition of idler roller 320 helps to counteract the normal force pushing on turbo shaft 302, since the idler roller 320 is substantially opposite to roller 314 and can have an equal but opposite reactive normal force on turbo shaft 302. By using the idler roller 320, as shown in FIG. 3A, there is lower force on bearings 318, 319 that stabilize and locate turbo shaft 302, since the net force on turbo shaft 302 from roller 314 and idler roller 320 is close to zero.

Figure 3B:
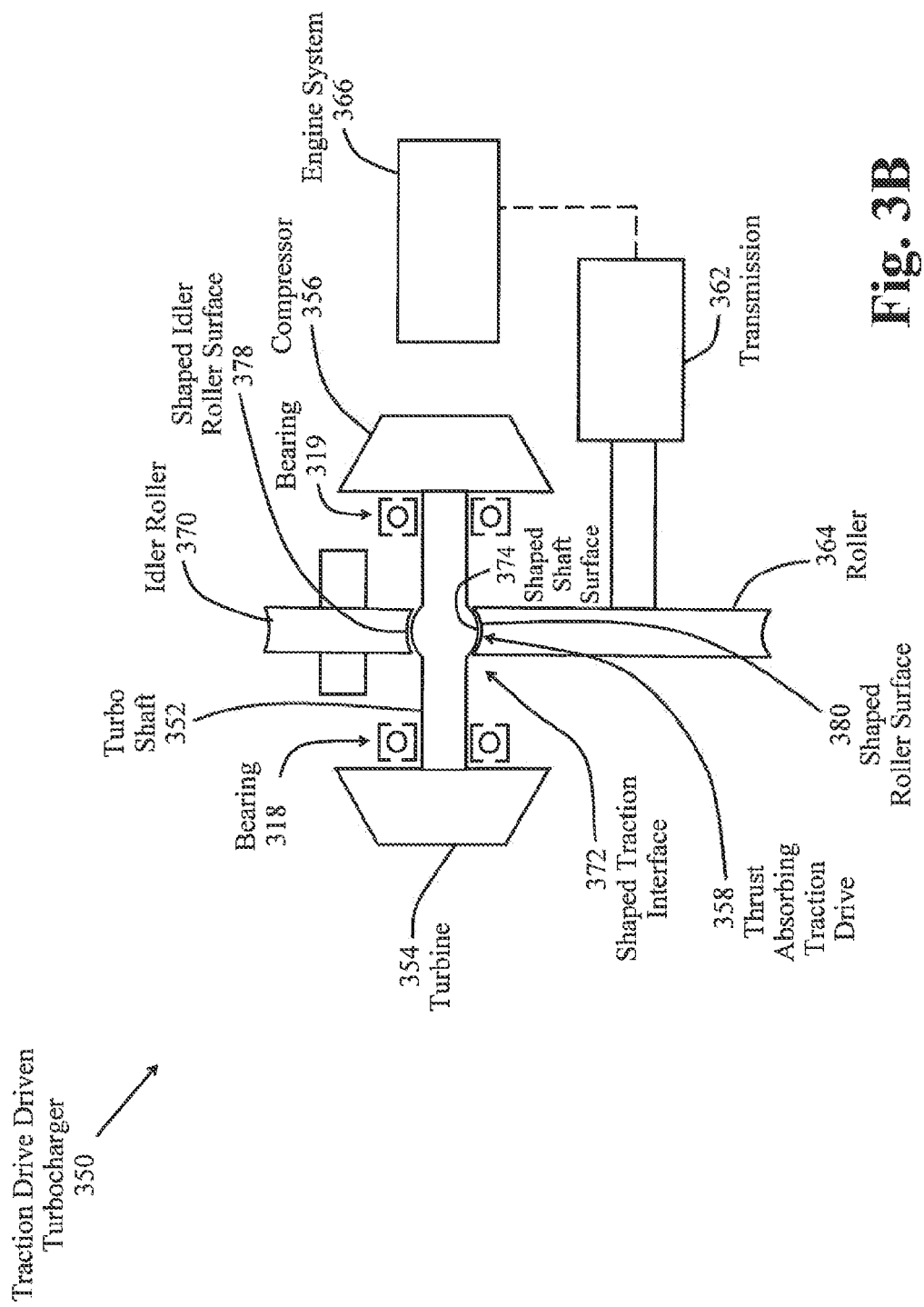

FIG. 3B is a schematic illustration of another embodiment of a traction drive driven turbocharger 350. As illustrated in FIG. 3B, turbo shaft 352 connects the turbine 354 to the compressor 356. A thrust absorbing traction drive 358 provides a shaped traction interface 372 between the roller 364 and the turbo shaft 352 that locates the turbo shaft 352 axially. As such, bearings 318, 319 do not need to support the turbo shaft 352 axially. The shaped traction interface 372 includes a shaped roller surface 380 that engages the shaped shaft surface 374. Additionally, the shaped shaft surface 374 engages the shaped idler roller surface 378. Again, a curved shape has been shown in FIG. 3B, but various shapes can be used, such as disclosed in U.S. Patent Application Ser. No. 61/906,938, filed Nov. 21, 2013, entitled "Thrust Absorbing Planetary Traction Drive Superturbo," which has been specifically incorporated for all that it discloses and teaches. The idler roller 370 opposes the forces that are normal to the turbo shaft 352 that are generated by the roller 364, so that bearings 318, 319 do not need to support the turbo shaft in a direction that is normal to the axis of rotation of the turbo shaft 352. With the addition of idler roller 370 and shaped traction interface 372, the overall force on turbo shaft 352 is close to zero, so bearings 318 and 319 have lower design requirements. Any desired manner of forcing the roller 364 against the turbo shaft 352 to create the shaped traction interface 372 that is capable of carrying torque can be utilized. The various methods disclosed in U.S. Pat. No. 8,561,403, issued Oct. 22, 2013, entitled "Super-Turbocharger Having a High Speed Traction Drive and a Continuously Variable Transmission," for increasing the torque and for varying the torque according to the load, can be utilized. U.S. Pat. No. 8,561,403 is specifically incorporated herein by reference for all that it discloses and teaches. Of course, this is true for all of the embodiments disclosed herein. The roller 364 is connected to the transmission 362, which, in turn, can be coupled to the engine system 366.

Figure 4A:
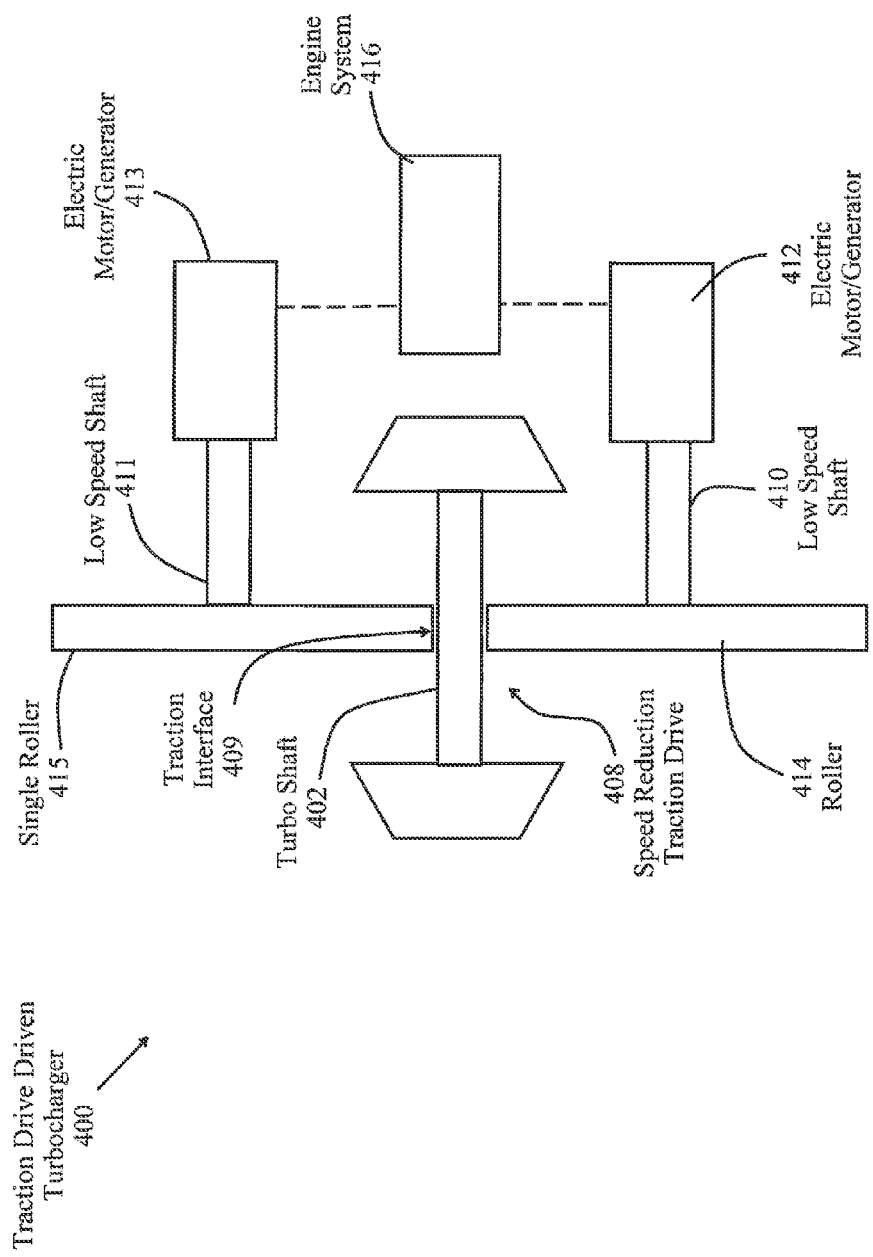
FIGS. 4A and 4B are schematic drawings of two roller traction drives on opposite sides of the turbo shafts that are then connected to two electric motor/generators.

FIG. 4A is a schematic drawing of another embodiment of a traction drive driven turbocharger 400 that uses two electric motor/generators 412, 413. Effectively, this embodiment has two identical traction interfaces 408, 409 on opposite sides of turbo shaft 402. The opposed rollers 414, 415 balance out the radial forces on turbo shaft 402 that are generated by the normal forces required to transmit torque in traction interfaces 408, 409. This reduces the requirement for locating turbo shaft 402 in a direction normal to the axis of rotation of the turbo shaft 402. Each roller 414, 415 is connected to a low speed shafts 410, 411 that are in turn connected to electric motor/generators 412, 413. Packaging of two mechanical transmissions on opposite sides of turbo shaft 402 would be difficult, so use of electric motor/generators 412, 413 is preferred. Each electric motor/generator 412, 413 is electrically coupled to engine system 416, and are controlled in unison to transmit equal amounts of power to and from engine system 416 to keep the power through traction drive driven turbocharger 400 balanced. Electric motor/generators 412, 413 are connected to power electronics of engine system 416 that control power to and from electric motor/generators 412, 413, which can then in turn be connected to a battery system or another motor/generator attached to the engine of engine system 416, such as illustrated in FIGS. 2D and 2E.

Figure 4B:
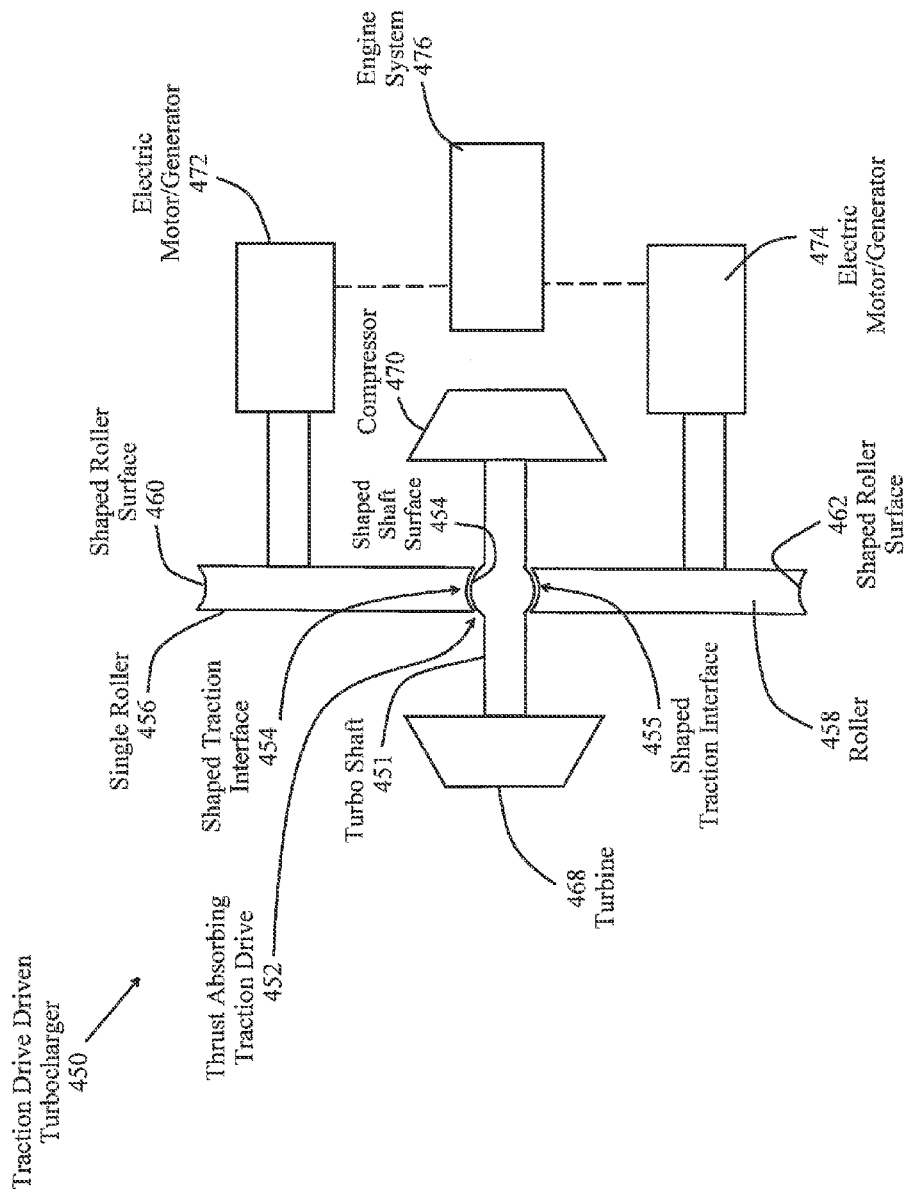

FIG. 4B is a schematic illustration of another embodiment of a driven turbocharger 450. The embodiment of FIG. 4B is the same as the embodiment of FIG. 4A, with the exception that a thrust absorbing traction drive 452 is utilized. As shown in FIG. 4B, there are two rollers 456, 458 that form shaped traction interface 454 and shaped traction interface 455, respectively. These shaped traction interfaces 454, 455 are collectively referred to as the thrust absorbing traction drive 452. The turbo shaft 451 connects the turbine 468 and compressor 470. The turbo shaft 451 has a shaped shaft surface 464 that interfaces with the shaped roller surface 460 of roller 456 and the shaped roller surface 462 of the roller 458. The rollers 456, 458 are pressed inwardly toward the turbo shaft 451 to form the thrust absorbing traction drive 452. The forces on the rollers 456, 458 balance themselves so that the turbo shaft 451 remains in a centered position between the rollers 456, 458. Roller 456 drives the electric motor/generator 472. Roller 458 drives the electric motor/generator 474. Electric motor/generators 472, 474 are coupled to engine system 476.

Accordingly, the embodiments of the present invention provide a traction drive, speed step-down converter from the turbo shaft to a lower speed shaft that can then be connected to a more conventional electric motor/generator or mechanical transmission. A basic version of this traction drive is a roller with a diameter greater than the turbo shaft that interfaces with the turbo shaft to form the speed reduction traction drive. The roller is pressed against the turbo shaft with sufficient normal force to transmit torque to and from the turbo shaft without excessive slip. Traction fluid may also be used to increase the coefficient of friction, so that more torque can be transmitted. In this way, torque can be transmitted to the turbo shaft during transient acceleration to reduce turbo lag, and torque can be transmitted from the turbo shaft during high load operation when excessive turbine power exists beyond what is required to drive the compressor. This excess power can then be transferred to the engine system as compounding power, increasing the power and efficiency of the engine system.

With the speed reduction traction drive, high turbo shaft speeds of 100,000 to 200,000 can be reduced to speeds in the range of 10,000 to 20,000 at the low speed shaft with a reduction ratio of 10:1. As an example, for a turbo shaft with a diameter of 10 mm, this would require a roller diameter of 100 mm to reach this 10:1 ratio. Other reduction ratios can be used as well, depending upon packaging and performance requirements. The lower speeds, after the speed reduction, are acceptable speeds for more traditional electric motors, and electric motor/generators can be moved to a better operating environment away from the hot turbine and compressor on the turbo shaft. Similarly, the lower speeds are acceptable for mechanical transmissions, including CVT transmissions as well as discrete, gear driven transmissions. The electric motor/generator or mechanical transmission is then coupled to the engine system and transfers power between the engine system and the driven turbocharger.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A driven turbocharger for an engine system comprising:
a turbo shaft;
a compressor connected to a first location on said turbo shaft;
a turbine connected to a second location on said turbo shaft;
a roller coupled to said turbo shaft through a traction interface at a third location on said shaft, said roller having a diameter that is larger than a diameter of said turbo shaft at said third location so that rotational speed of said roller is less than rotational speed of said turbo shaft
a low speed shaft that is connected to said roller;
a transmission that is coupled to said low speed shaft and said engine system to transfer power between said driven turbocharger and said engine system so that said low speed shaft drives said transmission at a rotational speed that is less than said rotational speed of said turbo shaft.

2. The driven turbocharger of claim 1 where said transmission is an electric motor/generator that is electrically coupled to said engine system.

3. The driven turbocharger of claim 1 where said transmission is a mechanical transmission that is mechanically coupled to said engine system.

4. The driven turbocharger of claim 3 where said mechanical transmission is a continuously variable transmission.

5. The driven turbocharger of claim 1 where an idler roller is located on an opposite side of said turbo shaft from said roller to balance normal forces on said turbo shaft from said speed reduction traction drive.

6. The driven turbocharger of claim 1 where a shaped traction interface exists between said roller and said turbo shaft that locates said turbo shaft axially.

7. A method of coupling a driven turbocharger to an engine system comprising:

creating a traction interface between a turbo shaft that is connected to a turbine and a compressor and a roller that has a roller diameter that is larger than a diameter of said turbo shaft;

connecting a low speed shaft, that is connected to said roller, to a transmission that transfers power between said engine system and said turbo shaft.

8. The method of claim 7 wherein said transmission comprises an electric motor/generator that is electrically coupled to said engine system.

9. The method of claim 7 wherein said transmission is a mechanical transmission that is mechanically coupled to said engine system.

10. The method of claim 9 wherein said mechanical transmission is a continuously variable transmission.

11. The method of claim 7 further comprising an idler roller located on an opposite side of said turbo shaft from said roller to balance normal forces on said turbo shaft from said speed reduction traction drive.

12. The method of claim 7 further comprising a shaped traction interface between said roller and said turbo shaft that locates said turbo shaft axially.

13. A driven turbocharger for an engine system comprising:

a turbo shaft having a first diameter;

a compressor connected to a first location of said turbo shaft;

a turbine connected to a second location of said turbo shaft;

a first roller having a second diameter that is greater than said first diameter of said turbo shaft that interfaces with said turbo shaft at a third location on a first side of said turbo shaft;

a second roller, having a third diameter, that interfaces with said turbo shaft at said third location on a second side of said turbo shaft, said second side being substantially opposite to said first side of said turbo shaft;

a first electric motor/generator that is coupled to said first roller and is electrically coupled to said engine system, so that power can be transferred between said engine system and said turbo shaft;

a second electric motor/generator that is coupled to said second roller and is electrically coupled to said engine system, so that power can be transferred between said engine system and said turbo shaft.

* * * * *